Dec. 6, 1966  D. R. SCOTT  3,289,935
THERMOSTATIC CONTROL DEVICE
Filed Aug. 6, 1964  2 Sheets-Sheet 1
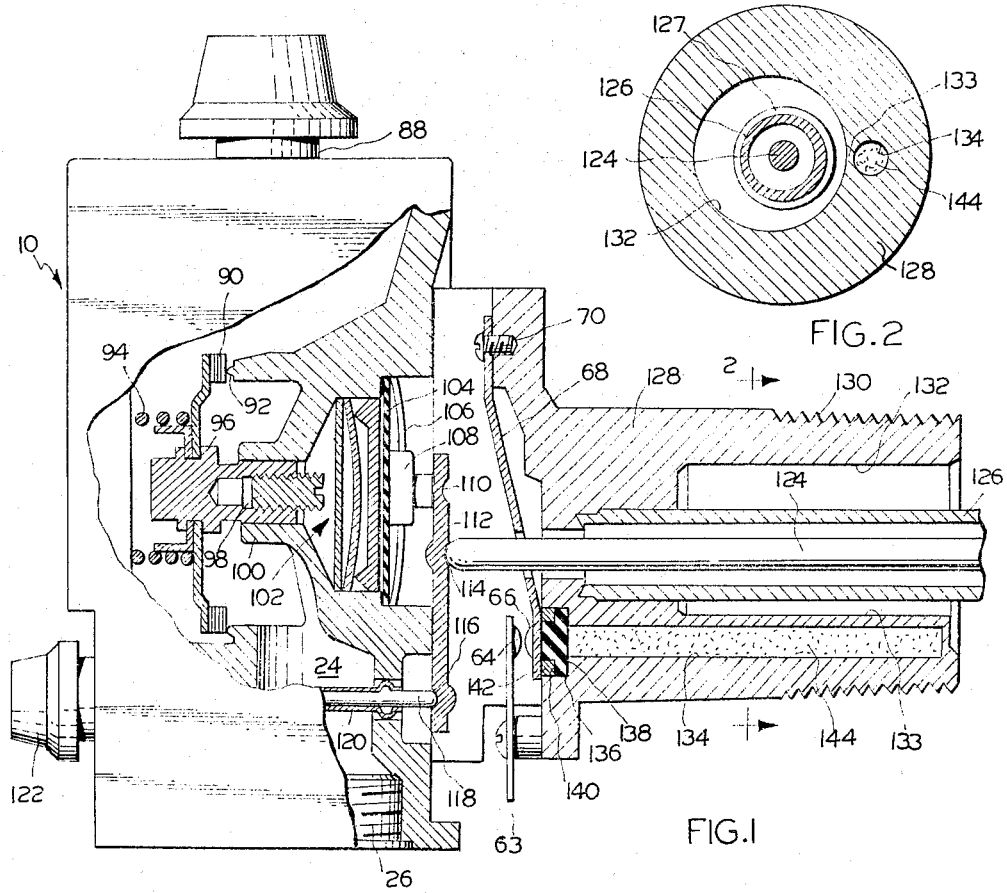
INVENTOR
DOUGLAS REX SCOTT
BY Anthony A. O'Brien
ATTORNEY Dec. 6, 1966 D. R. SCOTT 3,289,935
THERMOSTATIC CONTROL DEVICE
Filed Aug. 6, 1964 2 Sheets-Sheet 2

INVENTOR
DOUGLAS REX SCOTT

BY Anthony A. O'Brien
ATTORNEY

United States Patent Office 3,289,935
Patented Dec. 6, 1966

3,289,935
THERMOSTATIC CONTROL DEVICE
Douglas Rex Scott, Santa Ana, Calif., assignor to Robertshaw Controls Company, Richmond, Va., a corporation of Delaware
Filed Aug. 6, 1964, Ser. No. 387,915
13 Claims. (Cl. 236—21)

This invention relates to thermostatic control devices and in particular to such a device for preventing abnormal temperature conditions in a heating appliance such as a hot water heater.

It is common practice in heating appliances such as hot water heaters to supply fuel to a main burner and to a pilot burner, with the main burner flow being thermostatically controlled and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube type thermostat.

In order to prevent dangerously high temperatures being developed in the hot water tank, the prior art as exemplified by U.S. Patent No. 2,781,977, a thermostatic switch is attached to the upper exterior of the hot water tank and is connected in series with the thermoelectric circuit. While this arrangement presents some protection against abnormal temperature conditions, it includes certain disadvantages such as cost of installation and responding only to the temperature at the top of the hot water tank.

It is, therefore, an object of the present invention to incorporate a separate thermal sensor in the same mounting as the rod and tube thermostat in a control device.

Another object of this invention is to mount two different temperature sensors in the same shank for attachment to a control device casing.

This invention has another object in that thermally expandable charge material is effectively sealed in the thermostat mounting shank of a control device.

It is a further object of the present invention to facilitate rapid heat conduction to a thermally expandable charge material carried in the thermostat mounting shank of a control device.

A further object of the present invention is to ground the circuit of a thermoelectric safety means in response to an overtemperature sensing means carried by the thermostat mounting shank of a control device.

In practicing the present invention, a control device casing is provided with control means movable between controlling positions with operating means for effecting such movement, first temperature responsive means for actuating the operating means between controlling positions corresponding to first and second temperature conditions, means including interrupting means operative to exercise supervisory control over the control means, a mounting shank attaching the first temperature responsive means to the casing rod having a bore therein, second temperature responsive means in the bore including a charge of thermally expandable material expanding at a predetermined third temperature condition, sealing means for the bore including an element movable by the expanding material, and operative connective means between such movable element and the interrupting means for operating the same upon occurrence of the third temperature condition.

Other objects and advantages of the present invention will become apparent from the following description taken in connection with the accompanying drawing wherein:

FIGURE 1 is a side elevation of a control device with parts broken away and parts in section of a control device embodying the present invention;

FIGURE 2 is a cross section view taken along line 2—2 of FIGURE 1;

FIGURE 3 is a schematic diagram of a fuel burner system embodying the device of FIGURE 1;

Figure 5:
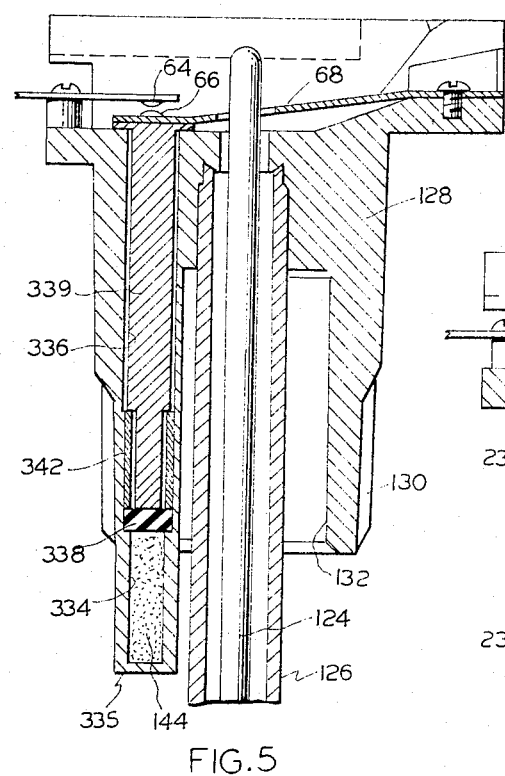
FIGURE 5 is a partial cross section of another modification of the shank mounting of FIGURE 1.

While the present invention may be applicable to various types of heating appliances and may be utilized in connection with electrical heating elements as well as gaseous fuel burning heater elements, it will be described in connection with a fuel burner control system for a hot water heater.

As is illustrated in FIGURES 1 and 2, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 leading to a main flow outlet port 26 which communicates with a conduit 28 for supplying fuel to a main burner 30.

The pilot flow passage 16 communicates with the common passage 14 intermediate its opposite ends which define a downstream valve seat 32 and an upstream valve seat 34 that is controlled by thermoelectric safety valve means. As is shown in FIGURE 3, the thermoelectric safety valve means includes a valve member 36 movably disposed for cooperation with the valve seat 34. The valve member 36 is fixed to one end of an armature stem 38 which slidably extends through a sealed aperture and which has its other end fixed to an armature 40 located in a fixed magnet housing 42. A coil spring 44 surrounds one end of the armature stem 38 and is mounted in compression between the end of the magnet housing 42 and the rear surface of the valve member 36 which is thus biased to a closed position against the valve seat 34. The valve member 36, stem 38 and armature 40 reciprocate as a unit between released and attached positions relative to fixed electromagnetic means in the form of a generally U-shaped magnet core 46 and an electric coil 48 wound thereon. The magnet core 46 is secured in the magnet housing 42 by any suitable means and the energizing coil 48 has one end connected to a ground lead 50 and its other end connected to a thermocouple cable connector 52.

The thermocouple cable connector 52 includes a seat member 54 having one end connected to the lead of coil 48 and its other end provided with an arcuate seat and a head member 56 having one end provided with a conforming arcuate head and its other end connected to a thermocouple cable 58. The thermocouple cable 58 is connected to the thermocouple 60 which is positioned in the flame of the pilot burner 22. Interposed between the arcuate portion of the seat member 54 and head member 56 is a conforming arcuate conductor 62 having a lead line 63 connected to a fixed contact 64; a cooperating contact 66 is mounted on the end of a flexible conductor strip 68, the opposite end of which is connected to a ground terminal 70.

The downstream valve seat 32 is controlled by combined reset and valve means which includes a valve member 72 carried adjacent one end of a reset stem 74. Such one end of the stem 74 is disposed for movement through the passage 14 to engage the safety valve member 36. The opposite end of the stem 74 extends through a sealing collar 76 on a plunger housing 78, in which a coil spring 80 encircles the stem 74 and is mounted in compression between the collar 76 and a disc 82 on the end of the stem 74. The stem 74 is retained in the housing 78 by means of a hollow pushbutton 84 which receives the stem disc 82 and which includes an annular bottom flange 86 engaging the housing wall surrounding an opening therefor.

The main flow of fuel from the valve seat 32 is controlled by a manually operable on-off valve 88 which may be a conventional tapered plug cock disposed in the main flow passage 24. Downstream of the tapered valve 88, the main flow of fuel is thermostatically controlled by a thermally responsive valve 90 which is operatively disposed in the main flow passage 24 just ahead of the main outlet 26.

The wall defining the main flow passage 24 is provided with an annular valve seat 92, toward which the valve disc member 90 is biased by a coil spring 94 mounted in compression between the surface of valve member 90 and an internal wall surface of the casing 10. A valve stem 96 has one end suitably connected to valve member 90 and a free end with an adjustable set screw 98 projecting through a guide 100 formed in a rear wall of casing 10 to extend into engagement with actuating means 102. The actuating means is a conventional snap acting mechanism in which a clicker disc moves from an inoperative to an operative position through an over center position with a snap action in response to an applied operating force. The snap acting actuator means 102 is retained in an exterior recess formed in the rear wall of casing 10 by means of a seal-retainer assembly including a diaphragm seal 104 and a bowed washer 106 which is pressed fitted into the exterior recess. The operating force is applied by means of an operating button 108 extending through the opening of the washer 106 to engage the diaphragm seal 104.

The operating button 108 abuts a suitable projection 110 formed adjacent one end of an operating lever 112 which has an intermediate recess 114 receiving the end of the rod of a rod and tube type thermostat; a recess 116 formed adjacent the other end of the operating lever 112 receives the end of an adjusting shaft 118. The adjusting shaft 118 is axially movable in a sleeve 120 which extends across the passage 24 and sealed at both ends; the opposite end of the shaft 118 abuts an adjusting screw (not shown) which is threaded through the front wall of casing 10 and which carries a temperature selection knob 122 on its external end. With such an arrangement it is now apparent that rotation of the temperature selection knob 112 through a selective range of temperature settings will change the relative position of the operating lever 112 whereby the temperature at which the rod and tube thermostat effects actuation of the snap acting mechanisms 102, will be determined by the present position of the lever 112.

The thermostat for actuating the lever 112 includes a conventional rod and tube type in which a rod 124 of relatively non-expandable material is concentrically disposed in a tube 126 of relatively expandable material. The free ends of the rod 124 and tube 126 are integrated as by a hollow bolt 127 disposed in the annular space between the rod and tube and threadedly engaging both the rod and tube; the mounting end of tube 126 is secured as by threads to a mounting shank 128 which is attached to the rear wall of casing 10 as by threaded bolts (not shown). The end of mounting shank 128 includes external threads 130 for threading the assembly through the wall of a hot water tank (not shown) and an internal recess 132 coextensive with portions of the rod 124 and tube 126; with such an arrangement, substantially the entire length of the tube 126 is disposed in the hot water resulting in a more accurate and faster response of the rod and tube assembly.

As is illustrated in FIGURE 1, the mounting shank 128 has a blind bore 134 extending in spaced parallel relation to the axis of the rod 124 and for substantially the entire length of the mounting shank 128. As shown in FIGURE 2, the adjoining wall between the recess 132 and the bore 134 includes a wall portion having an arcuate cross section. The open end of bore 134 is provided with a counterbore defining a circular recess 136 and a rubber diaphragm 138 is disposed in the recess 136 to seal and close the bore 134. The outermost portion of the diaphragm 138 has a peripheral cut out to define an annular recess 140 having a substantially square cross section; an annular Welsh plug is sealed in the recess 140 and frictionally engages the wall of recess 136 to retain the diaphragm 138 in the bore recess 136. The exposed end of the diaphragm 138 abuts the spring arm 68 on its undersurface opposite to the contact 66.

The bore 134 is filled with a thermally responsive charge material adapted to increase rapidly in volume at a particular temperature, such as 180° F. to define a second thermal element for the control device. For example, an appropriate wax composition charge is sold by the Warick Wax Company under the trademark "Mekom-White," which is adapted to undergo a change of state from a solid to a liquid at 180° F. Selected silicone rubber may also be used as the charge material, although the rubber would not undergo a change of state, the expansion thereof as it approaches 180° F. would be adaquate to move the diaphragm 138 and associated spring arm 68.

To place the system of FIGURES 1 and 2 in operation, the manual valve 88 is rotated to an on position and the temperature setting dial 122 is rotated to a selecter temperature, e.g., 140° F. for conventional hot water heaters. The reset button 84 is manually depressed whereby the valve member 72 is closed on valve seat 32 to prevent any fuel flow to the main flow passage 24 and whereby the valve stem 74 moves the valve member 36, stem 38 and armature 40 as a unit against the bias of coil spring 44 to an attracted or valve open position permitting a fuel flow through the pilot flow passage 16 to the pilot burner 22 where it is ignited as by a match. As soon as the thermocouple 60 is heated sufficiently by the pilot burner flame to energize the holding electromagnetic means, core 46 and coil 48, the push button may be released whereby the armature 40 is held in its attracted postion and both valve seats 32 and 34 are open. Inasmuch as the rod and tube thermostat is in its contracted state, the valve member 90 is open permitting fuel flow to the main burner 30 which is ignited by the flame of the pilot burner 22.

As the water temperature increases, the tube 126 expands and, since the tube 126 is fixed at its inner end to the mounting shank 128, the tube expands longitudinally in the direction away from the mounting shank 128; the non-expanding rod 124 is pulled to the right, as viewed in FIGURE 1, by the expanding tube 126 thus decreasing the applied force on the operating lever 112. When the water temperature reaches 140° F., the applied force on the operating button 108 is reduced to the point where the snap mechanism 102 returns to its position shown in FIGURE 1 permitting the valve member 90 to be closed by its return spring 94; the main fuel flow is thus cut off and the main burner 30 is extinguished. A subsequent decrease in the water temperature, as when the hot water is drawn off and replenished with cold water, causes contraction of the tube 126 whereupon the main valve 90 is again opened. During normal operation, the main burner 30 will be cycled thermostatically as outlined above to maintain the water temperature at 140° F.

Should the flame at the pilot burner 22 be extinguished from any cause, the thermocouple 60 will cool and the thermoelectric current to the coil 48 will cease; thereupon the armature 40 will be released from the magnet core 46 under the bias of the coil spring 44 which closes the valve member 36 on the valve seat 34 to effect 100% shut off of any fuel flow. In order to place the system in operation again, the resetting procedure outlined above must be repeated.

In accordance with the present invention, the control device is provided with a separate thermally responsive means to prevent excessively higher water temperatures that could cause explosion of the hot water tank. In the event the water temperature increases to 180° F. due to some malfunction which keeps the main burner in operation, the charge material 144 undergoes a rapid volumetric expansion causing the diaphragm 138 to flex to the left as viewed in FIGURE 1. The leftward movement of the diaphragm 138 causes bending of the spring arm 68 whereby the contact 66 is moved against the contact 64 which is fixed to the rear wall of the mounting shank 128 by means of a dielectric bushing so as to be electrically insulated from the mounting shank. When the contacts 64 and 66 are mated, the thermoelectric circuit from the thermocouple 60 is grounded as follows: from the cable connector head 52, through the conductor 62, the lead line 63, contacts 64 and 66, and the conductive spring arm 68 to the ground terminal 70. The closure of the grounding circuit short circuits the energizing circuit for the magnet coil 48; reducing current flow through the electromagnetic coil 48 sufficiently to cause a release of the armature 40 whereby the valve member 36 is closed to effect 100% shut off of any fuel flow as described above. As soon as the water temperature decreases to its normal operating range, the short circuiting contacts 64 and 66 are again separated, however, to commence operation of the system, the resetting procedure must be repeated as outlined above.

The rod and tube thermostat constitutes first temperature responsive means for effecting thermostatic cycling of the main control means including the valve 90 which is thus moved between controlling positions corresponding to first and second temperature conditions. In the event the main control means fails to cycle properly, the water temperature may be increased to a critical temperature condition. The second temperature responsive means, constituted by the thermally expandable material 144, is then expanded to cause operation of short circuiting means which exercises supervisory control over the main control means whereby the system is shut down upon the occurrence of a predetermined third temperature condition.

In FIGURE 1, the longitudinal axis of the shank recess 132 is offset from the longitudinal axis defined by the shank and the rod and tube assembly; thus a portion of the shank wall has a larger thickness than the remaining portion. The bore 134 is disposed in this thickened wall portion and, as is illustrated in FIGURE 2, the arcuate wall portion 133 presents a length of thin wall which rapidly conducts the heat from the hot water to the expandable material 144 in the bore 134.

Figure 4:
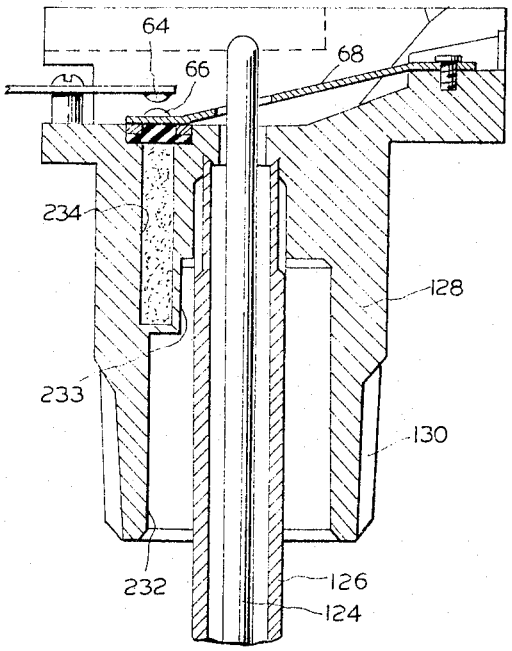
FIGURE 4 is a partial cross section of a modification of the shank mounting of FIGURE 1.

In the following description of the figures of the remaining figures of the drawing, identical reference numerals are used for identical parts already described above, reference numerals with 100 added are used for similar parts already described and new reference numerals are used for new parts; in addition, a sequence of operation will not be repeated except where it differs from that described above. Thus, in FIGURE 4, the mounting shank 128 includes a bore 234 which has a length only about half of the length of the shank, i.e., blind bore 234 terminates in the body of the shank so as not to be coextensive with the external threads 130. The shank recess 232 is substantially concentric with the rod and tube axis except for thin bottom wall portion 233 defining the adjacent wall portion of the bore 234. The arrangement of FIGURE 4 may be termed a short shank design to suit particular installations.

In FIGURE 5, the shank 128 is formed with a hollow extension 335 which is coextensive and in spaced parallel relation to the rod and tube. The hollow extension 335 has an internal blind bore 334 communicating with an elongated counterbore 336. The charge material 144 fills the bore 334 that is closed by an annular diaphragm 338 pressed into the bottom of counterbore 336. A cylindrical sealing sleeve 342 is disposed on the top of diaphragm 338 and receives the reduced end portion of a cylindrical pusher rod 339; the inner end of pusher rod 339 abuts the diaphragm 338 and its outer end has an enlarged flange in engagement with the undersurface of spring arm 68. The extension 335 defines a conducting finger or capsule which projects into the hot water in the tank whereby substantially the entire extension 335 presents a large surface area for rapidly conducting heat to the charge material 144.

FIGURES 6–9 illustrate various means for sealing the open end of the blind bore 134 and it is to be understood that any one of the blind bores 134 (FIGURE 1), 234 (FIGURE 4) and 334 (FIGURE 5) may be closed by any one of the various sealing means.

Figure 6:
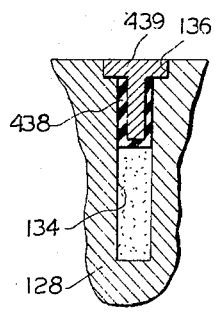
FIGURE 6 is a fragmentary cross section of a sealing means for sealing the second thermal element in the shank mounting.

In FIGURE 6, the sealing means includes a cup-shaped member 438 made of rubber or similar material with the brim of the cup member terminating adjacent the counterbore 136. A pusher element 439 made of brass material has an inner rod portion disposed in the cup member 438 and an outer peripheral flanged portion disposed in the counterbore 136.

Figure 7:
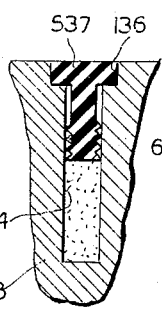
FIGURE 7 is a fragmentary cross section of a variation of FIGURE 6.

In FIGURE 7, the sealing means includes an integral seal and pusher 537 formed of a suitable plastic material such as nylon or Teflon. The integral element 537 has an inner rod-like member disposed in the end portion of bore 134 and is provided with a series of spaced annular ribs engaging the wall of the bore 134; an outer peripheral flanged portion of the plastic element 537 is disposed in the counterbore 136.

Figure 8:
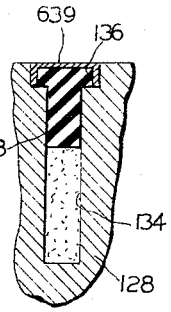
FIGURE 8 is a fragmentary cross section of another variation of FIGURE 6.

In FIGURE 8, the sealing means includes a sealing member 638 having inner rod-like member disposed in the bore 134 and an outer disc member integrally formed of rubber to define a T-shape cross section. The outer disc member is covered by an inverted cup-shaped pusher element 639 made of suitable metal material; the pusher 639 and covered disc member are disposed as a unit in the counterbore 136.

Figure 9:
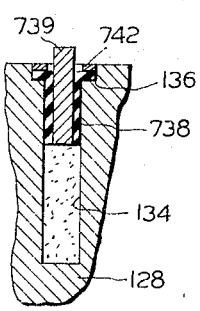
FIGURE 9 is a fragmentary cross section of another variation of FIGURE 6.

In FIGURE 9, the sealing means includes a sealing member 738 made of rubber having an inner sleeve disposed in the bore 134 and an integrally formed annular flange disposed in the bottom of the counterbore 136. A pusher element 739 is a metal rod-like element having an inner portion disposed in the sleeve of seal 738 and an outer portion projecting out of the counterbore. A snap ring 742 engages the annular flange of seal 738 and is disposed as a retainer in the counterbore 136.

Inasmuch as the present invention is subject to many variations, modifications and changes in details, it is intended that all matter contained in the foregoing description or shown on the accompanying drawings, shall be interpreted as illustrative and not in a limiting sense.

What is claimed is:

1. In a control device, the combination comprising a casing,
control means in said casing movable between controlling positions,
operating means for moving said control means,
first temperature responsive means actuating said operating means between controlling positions corresponding to first and second temperature conditions,
means including interrupting means operative to exercise supervisory control over said control means,
a mounting shank attaching said first temperature responsive means to said casing,
means defining a blind bore in said mounting shank disposed in spaced relation to said first temperature responsive means,
second temperature responsive means including a charge of thermally expandable material in said bore adapted to expand at a predetermined third temperature condition,
sealing means for said bore including an element movable by the expandable material when the same is expanded, and
means defining an operative connection between said movable element and said interrupting means for operating the same upon occurrence of the third temperature condition.

2. The combination as recited in claim 1 wherein the means defining said bore includes a counterbore, and said sealing means is disposed in said counterbore.

3. The combination as recited in claim 2 wherein the movable element of said sealing means comprises a diaphragm disposed in said counterbore.

4. The combination as recited in claim 3 wherein said sealing means further includes a sealing ring disposed in said counterbore and engaging said diaphragm.

5. The combination as recited in claim 2 wherein the movable element of said sealing means comprises a pusher member and a diaphragm member disposed in said counterbore and said sealing means further includes a cylindrical sleeve engaging said diaphragm member and receiving a portion of said pusher member.

6. In a thermostatic control device for supplying fuel to main and pilot burner apparatus, the combination comprising
a casing having inlet and outlet means and flow passage means therebetween,
valve means in said passage means for controlling a fluid flow therethrough,
first temperature sensor means including a rod and tube,
a mounting shank for securing said first temperature sensor means to said casing,
means defining an operative connection between said rod and said valve means for actuating the same in a normal range of temperatures,
thermoelectric safety means for controlling the fluid flow through said passage independently of said valve means,
circuit means electrically connected to said thermoelectric safety means and including a pair of contacts,
means defining a bore in said mounting shank disposed in spaced relation to said rod and tube,
second temperature sensor means including a charge of thermally expandable material in said bore,
and sealing means for said bore including a movable element disposed adjacent said contacts for movement thereof whereby said circuit means is activated to actuate said thermoelectric safety means in response to an abnormal temperature sensed by said second temperature sensor means.

7. The combination as recited in claim 6 wherein said bore has an axial length coextensive with a portion of said mounting shank.

8. The combination as recited in claim 6 wherein said bore has an axial length terminating intermediate said mounting shank.

9. The combination as recited in claim 6 wherein said mounting shank is provided with a hollow extension and said bore is disposed in said hollow extension.

10. The combination as recited in claim 6 wherein the means defining said bore includes a counterbore, said sealing means comprises a cup-shaped sleeve disposed in said bore adjacent said counterbore, and the movable element of said sealing means comprises a pusher member having a portion disposed in said cup-shaped sleeve and a portion disposed in said counterbore.

11. The combination as recited in claim 6 wherein the means defining said bore includes a counterbore, said sealing means comprises a resilient rod member having a plurality of annular ribs disposed in said bore adjacent said counterbore, and the movable element of said sealing means comprises a pusher member integrally formed on said resilient rod member and being disposed in said counterbore.

12. The combination as recited in claim 6 wherein the means defining said bore includes a counterbore, said sealing means comprises an integrally formed rod member and disc member with said rod member being disposed in said bore adjacent said counterbore, and the movable element of said sealing means comprises an inverted cup-shaped member covering said rod member and being disposed in said counterbore.

13. The combination as recited in claim 6 wherein the means defining said bore includes a counterbore, said sealing means comprises a resilient sleeve and an integrally formed flange with said sleeve being disposed in said bore adjacent said counterbore, retaining ring means disposed in said counterbore and engaging said flange, and the movable element of said sealing means comprises a pusher rod having an inner portion disposed in said sleeve and an outer portion projecting out of said counterbore.

References Cited by the Examiner

UNITED STATES PATENTS

| | | | |
|---|---|---|---|
| Re. 24,442 | 3/1958 | Eskin | 36—21 |
| 1,325,896 | 12/1919 | Long | 236—21 |
| 2,128,274 | 8/1938 | Vernet | 236—34 X |
| 2,312,479 | 3/1943 | Ray | 236—21 |
| 2,773,649 | 12/1956 | Hilgert | 236—21 |
| 2,774,539 | 12/1956 | Eskin | 236—21 |
| 2,879,358 | 3/1959 | Hilgert | 236—21 X |

EDWARD J. MICHAEL, *Primary Examiner.*